United States Patent
Shah et al.

(10) Patent No.: US 11,233,863 B2
(45) Date of Patent: *Jan. 25, 2022

(54) PROXY APPLICATION SUPPORTING MULTIPLE COLLABORATION CHANNELS

(71) Applicant: ServiceNow, Inc., Santa Clara, CA (US)

(72) Inventors: Siddharth Shah, Bellevue, WA (US);
Donghang Lin, San Diego, CA (US);
Kyle Barron-Kraus, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/803,854

(22) Filed: Feb. 27, 2020

(65) Prior Publication Data

US 2020/0274938 A1    Aug. 27, 2020

Related U.S. Application Data

(63) Continuation of application No. 15/905,329, filed on Feb. 26, 2018, now Pat. No. 10,609,163.

(51) Int. Cl.
*H04L 29/08* (2006.01)
*H04L 12/26* (2006.01)
(Continued)

(52) U.S. Cl.
CPC .............. *H04L 67/20* (2013.01); *H04L 43/08* (2013.01); *H04L 51/04* (2013.01); *H04L 67/02* (2013.01);
(Continued)

(58) Field of Classification Search
CPC ....... H04L 67/20; H04L 67/02; H04L 67/146; H04L 67/42; H04L 51/04; H04L 69/16
(Continued)

(56) References Cited

U.S. PATENT DOCUMENTS 6,609,122 B1   8/2003 Ensor
7,020,706 B2   3/2006 Cates
(Continued)

FOREIGN PATENT DOCUMENTS

| EP | 2146477 A1 | * | 1/2010 | ........... H04L 43/022 |
| EP | 2146477 A1 | | 1/2010 | |
| EP | 3399695 A1 | | 11/2018 | |

OTHER PUBLICATIONS

Network Working Group, "IP Network Address Translator {NAT} Terminology and Considerations", P. Srisuresh et al., Aug. 1999, 30 pages.

*Primary Examiner* — Tauqir Hussain
(74) *Attorney, Agent, or Firm* — Fletcher Yoder PC

(57) ABSTRACT

An example embodiment performed by a proxy server application of a remote network management platform may involve receiving a message from a third-party application directed to an address of the proxy server application and containing an identifier related to a particular entity. The embodiment may also involve using a template associated with a protocol type of the message to parse the message and determine the identifier. The embodiment may also involve comparing the identifier to mapping data that defines pairwise associations between each of a plurality of identifiers and computational instances of a plurality of computational instances. Each such computational instance may be communicatively coupled and dedicated to a respective managed network controlled by a particular entity. The embodiment may also involve using the comparison as a basis for selecting a particular computational instance of the plurality of computational instances, and then transmitting the message to the particular computational instance.

20 Claims, 13 Drawing Sheets

(51) Int. Cl.
  *H04L 29/06*       (2006.01)
  *H04L 12/58*       (2006.01)
(52) U.S. Cl.
  CPC ............ *H04L 67/146* (2013.01); *H04L 67/28*
          (2013.01); *H04L 67/2838* (2013.01); *H04L*
                *67/42* (2013.01); *H04L 69/16* (2013.01);
        *H04L 69/18* (2013.01); *H04L 69/22* (2013.01);
                                  *H04L 69/329* (2013.01)
(58) Field of Classification Search
  USPC ....................................................... 709/206
  See application file for complete search history.

(56)            References Cited

U.S. PATENT DOCUMENTS

| | | | |
|---|---|---|---|
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,683 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,552 B2 | 9/2015 | Whitney |
| 9,239,857 B2 | 1/2016 | Trinon |
| 9,317,327 B2 | 4/2016 | Apte |
| 9,363,252 B2 | 6/2016 | Mueller |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,672,140 B1 | 6/2017 | Eberlein |
| 9,766,935 B2 | 9/2017 | Kelkar |
| 9,792,387 B2 | 10/2017 | George |
| 9,805,322 B2 | 10/2017 | Kelkar |
| 2004/0243688 A1* | 12/2004 | Wugofski ........... H04M 1/7243 |
| | | | 709/217 |
| 2004/0268241 A1* | 12/2004 | Layman ................ G06F 9/4493 |
| | | | 715/234 |
| 2012/0110156 A1* | 5/2012 | Guru ..................... H04L 67/125 |
| | | | 709/223 |
| 2014/0181256 A1* | 6/2014 | Trifa .................... H04L 67/327 |
| | | | 709/218 |
| 2016/0352588 A1* | 12/2016 | Subbarayan ........... H04L 67/32 |
| 2017/0063763 A1* | 3/2017 | Hu ........................... H04L 51/28 |

* cited by examiner

```
{
    "token": "XXYYZZ",
    "team_id": "TXXXXXXXX",        ⟵ 700
    "api_app_id": "AXXXXXXXXX",
    "event": {
        "type": "name_of_event",
        "event_ts": "1234567890.123456",
        "user": "UXXXXXXX1",
        ...
    },
    "type": "event_callback",
    "authed_users": [
        "UXXXXXXX1",
        "UXXXXXXX2"
    ],
    "event_id": "Ev08MEMKH6",
    "event_time": 1234567890
}
```

FIG. 7A

```
    "text": "Hi",
    "textFormat": "plain",
    "type": "message",
    "timestamp": "7017-10-27T18:17:41.8927",
    "localTimestamp": "2017-10-27T11:17:41.892-07:00",
    "id": "1509128261769",
    "channelId": "msteams",
    "serviceUrl": "https://smba.tmanager.net/amer-client-ss.msg/",
    "from": {
        "id": "29:1XQQY91I-S3ezv36ok_s8oxc8mg_X0X1miq6XrqjlaVv9uT0UxLNOVCrJhuhNalAyje1f27DgngMt5dOT2aPaoA",
        "name": "John Smith (Guest)",
        "aadObjectId": "ad703d37-424a-43bd-b1a8-5eb92642192e"
    },
    "conversation": {
        "id": "a:1qo-bmx 9WZmzyV6U5-pSLfdF1KFW9yKXE8DYBYolkOugktpIZPAKmLjKOpVJJMkbotoQO16f39YXndwBV9QHi9GvedwSrHdGH4BEmG70vajbuPLIGAMGusp5o2A1FXf"
    },
    "recipient": {
        "id": "28:bf2e6849-818b-44d8-a709-fa7895eaa9e3",
        "name": "snow bot"
    },
    "entities": [
        {
            "locale": "en-US",
            "country": "US",
            "platform": "Mac",
            "type": "ClientInfo"
        }
    ],
    "channelData": {
        "tenant": {                            ╭─ 702
            "id": "72F988bf-86f1-41af-91ab-2d7cde11db47"
        }
    }
```

FIG. 7B

```
{
    "sender": {
        "id": "<PSID>"
    },
    "recipient": {
        "id": "<PAGE_ID>"        — 704
    },
    "timestamp":1458692752478,
    "message": {
        "mid": "mid.1457764197618:41d102a3e1ae206a38",
        "text":"hello, world!",
        "quick_reply":{
            "payload": "<DEVELOPER_DEFINED_PAYLOAD>"
        }
    }
}
```

FIG. 7C

000
PROXY APPLICATION SUPPORTING MULTIPLE COLLABORATION CHANNELS

CROSS REFERENCE TO RELATED APPLICATIONS

This disclosure is a continuation of and claims priority to U.S. patent application Ser. No. 15/905,329, filed on Feb. 26, 2018, the entire contents of which are herein incorporated by reference.

BACKGROUND

A remote network management platform may provide a variety of services or other resources to a managed network. Such services or resources may take the form of websites, applications, or other web-accessible software within a computational instance of the remote network management platform, such as a messaging or "chat" application that enables internal users (e.g., employees) of the managed network or external users (e.g., customers) of the managed network to engage in conversations with each other or with an agent.

SUMMARY

In some cases, users might prefer to access available services or resources via third-party chat applications running on the users' client devices (e.g., mobile devices) as opposed to accessing such services or resources by way of a web interface of a computational instance. To facilitate this, a remote network management platform may be configured by the third-party application to use a distinct web address (e.g., a Uniform Resource Locator (URL)) of a chat server when accessing such services or resources.

However, it can be inefficient and logistically challenging for the remote network management platform to be configured in this manner when a large number of managed networks (e.g., hundreds or thousands) are supported. For example, each time an upgrade to the third-party chat application is produced, multiple versions of the third-party chat application are deployed, each with a different chat server URL. This results in a significant amount of time spent making sure that proper versions of the third-party chat application are available to the respective managed networks, and that the right users are being provided with the respective versions.

The present disclosure provides an improvement to a remote network management platform that can address these and other issues. In particular, each third-party chat application can be configured with a single URL that identifies a proxy server within the remote network management platform, and upon receipt of chat messages, the proxy server can engage in a process to demultiplex the messages to chat servers at the appropriate computational instances. As such, multiple networks managed by the remote network management platform can all use a single version of a given third-party chat application, thereby eliminating the need to configure multiple versions of the third-party chat application for each managed network.

Accordingly, a first example embodiment may involve receiving, by a proxy server application of a remote network management platform, a message from a third-party application executing on a client device disposed outside of the remote network management platform. The message may be directed to an address of the proxy server application and may contain an identifier related to a particular entity of a plurality of different entities. The remote network management platform may include a plurality of computational instances, each of which is communicatively coupled and dedicated to a respective managed network. The respective managed networks may be controlled by the plurality of different entities. Further, the proxy server application may be communicatively coupled to the plurality of computational instances.

The first example embodiment may also involve determining, by the proxy server application, a protocol type of the message. The first example embodiment may also involve based on a template associated with the protocol type that defines a location of the identifier, parsing, by the proxy server application, the message to determine the identifier. The first example embodiment may also involve comparing, by the proxy server application, the identifier to mapping data that defines pairwise associations between each of a plurality of identifiers and computational instances of the plurality of computational instances. The first example embodiment may also involve based on the comparison, selecting, by the proxy server application, a particular computational instance of the plurality of computational instances. The first example embodiment may also involve transmitting, by the proxy server application, the message to the particular computational instance.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 7A illustrates a message that can be received by a proxy server, in accordance with example embodiments.

FIG. 7B illustrates a message that can be received by a proxy server, in accordance with example embodiments.

FIG. 7C illustrates a message that can be received by a proxy server, in accordance with example embodiments.

DETAILED DESCRIPTION

Figure 1:
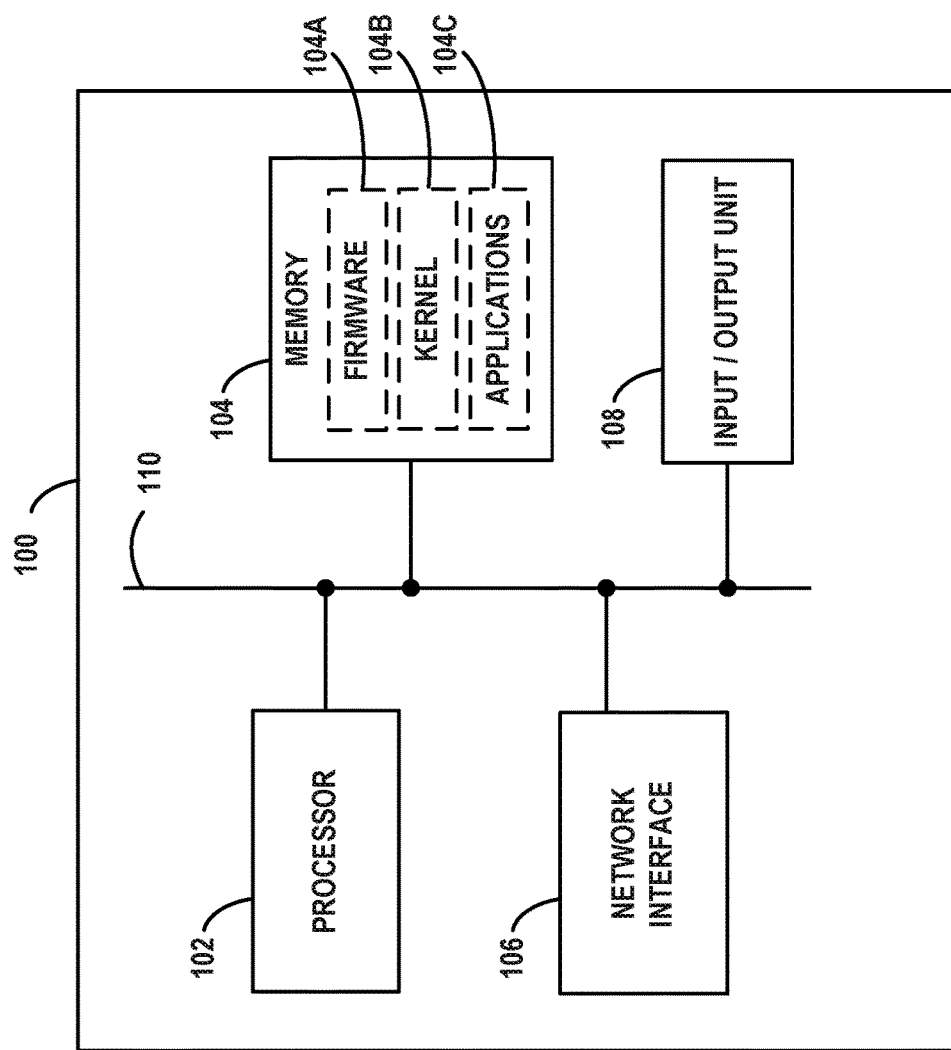
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
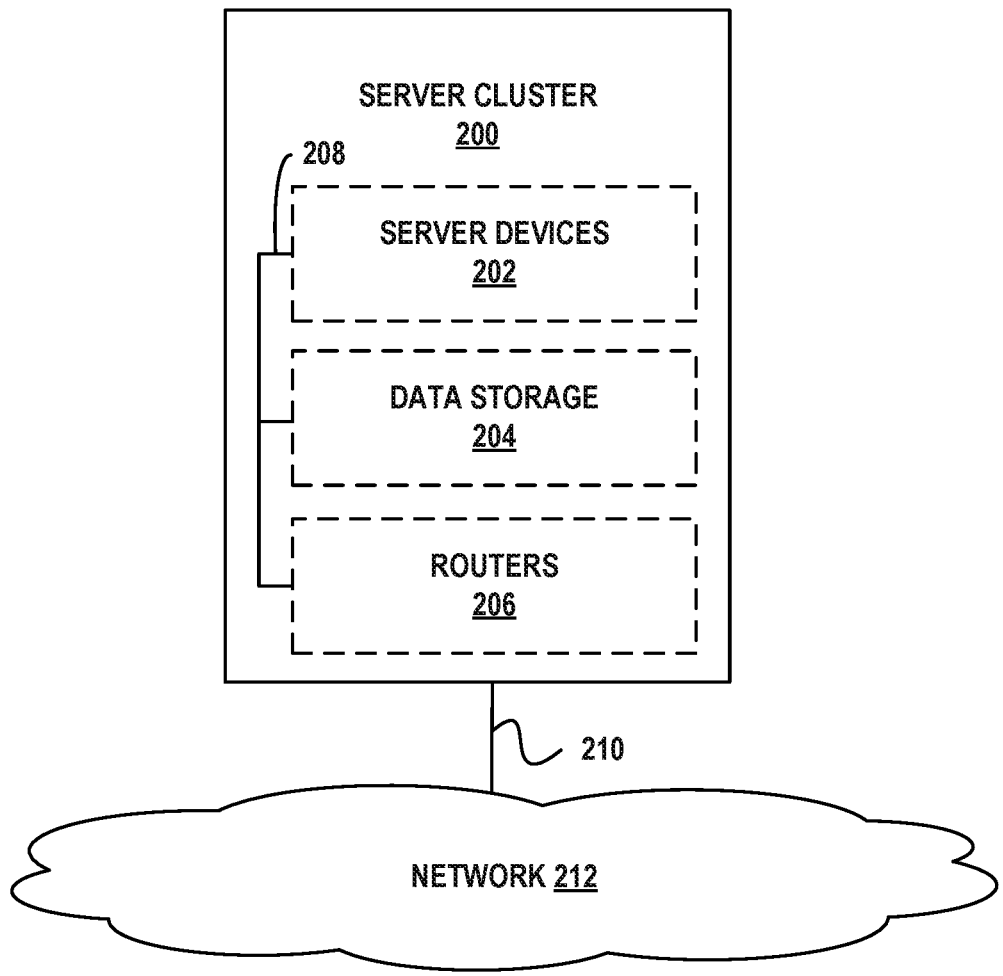
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
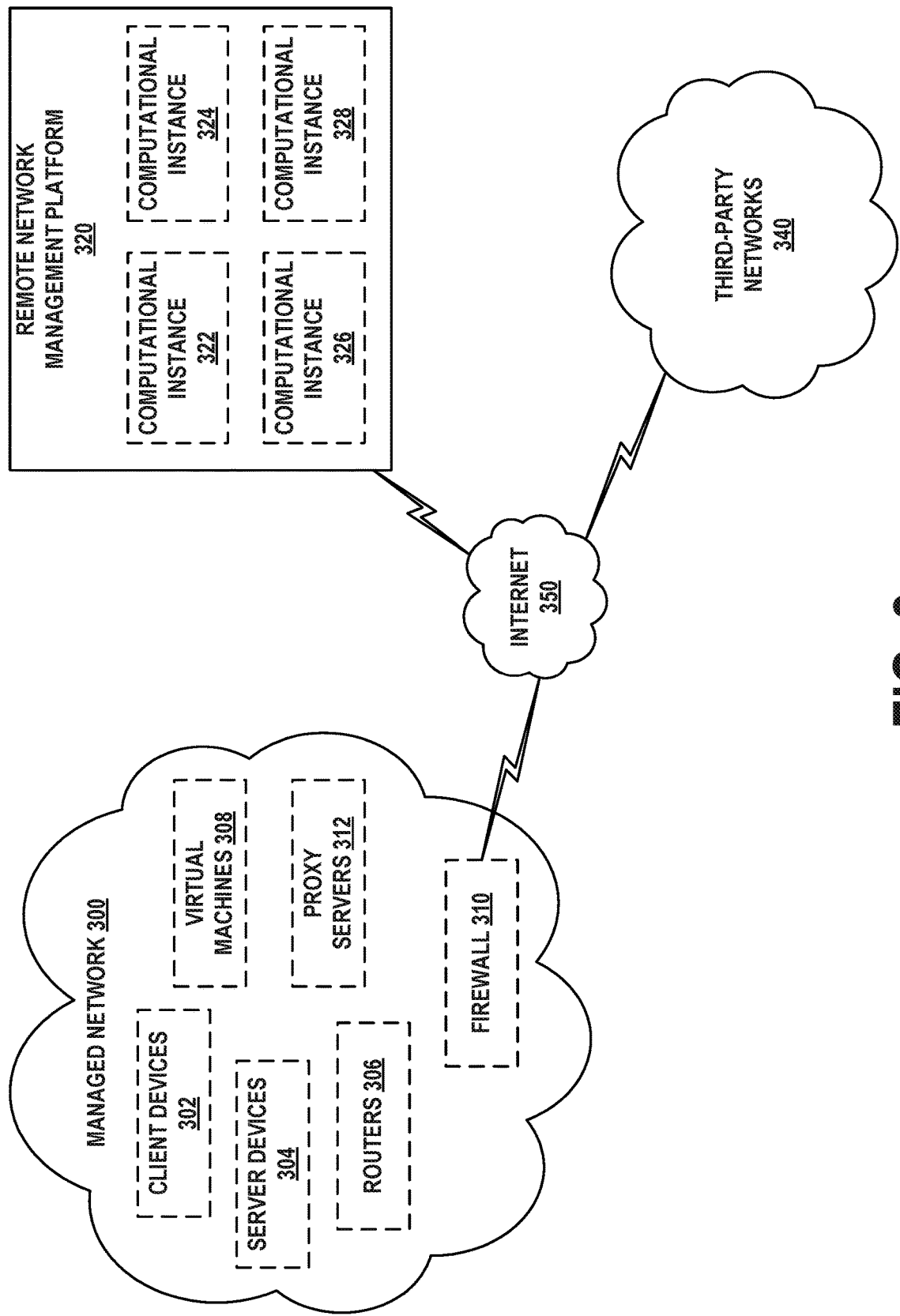
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
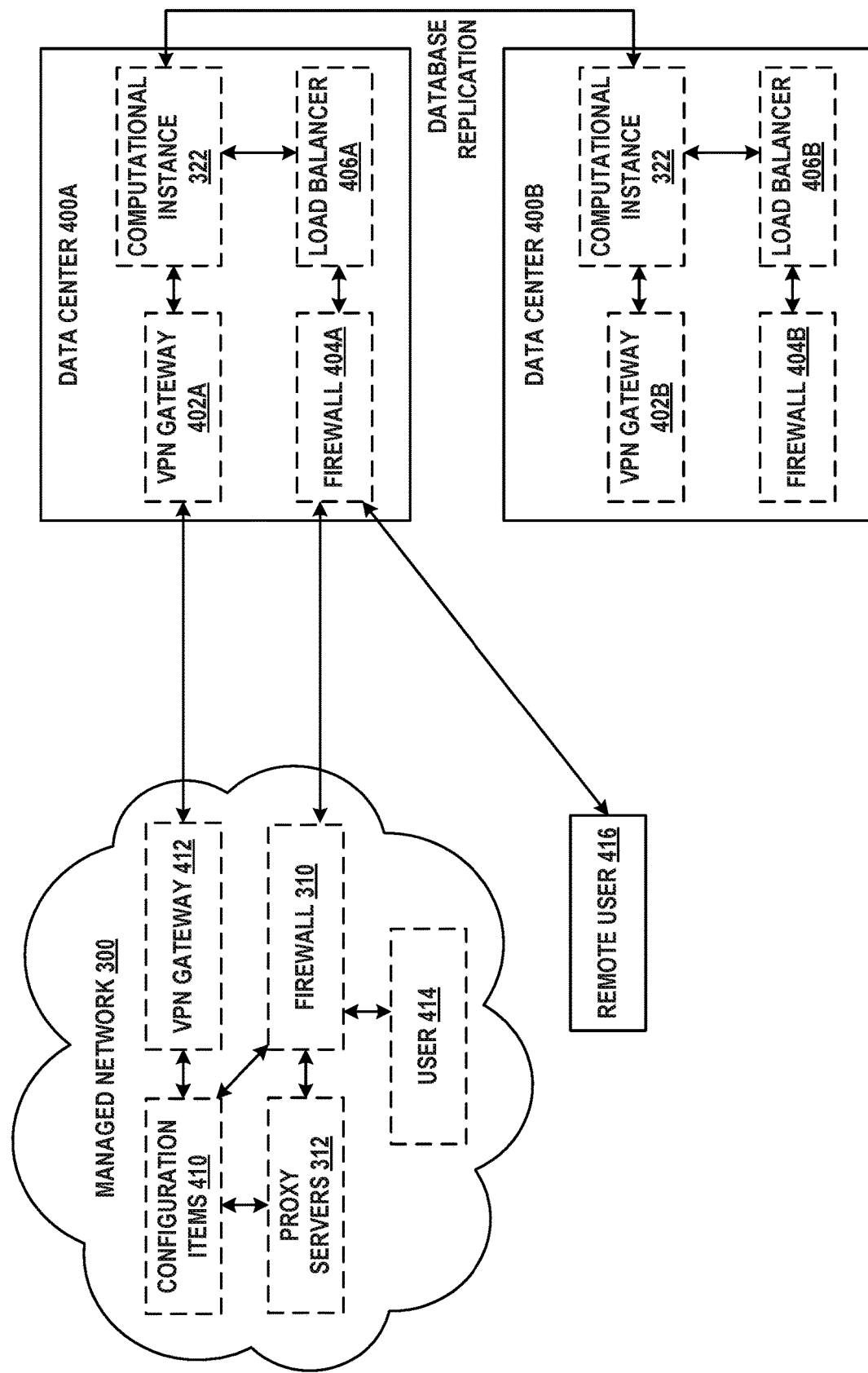
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
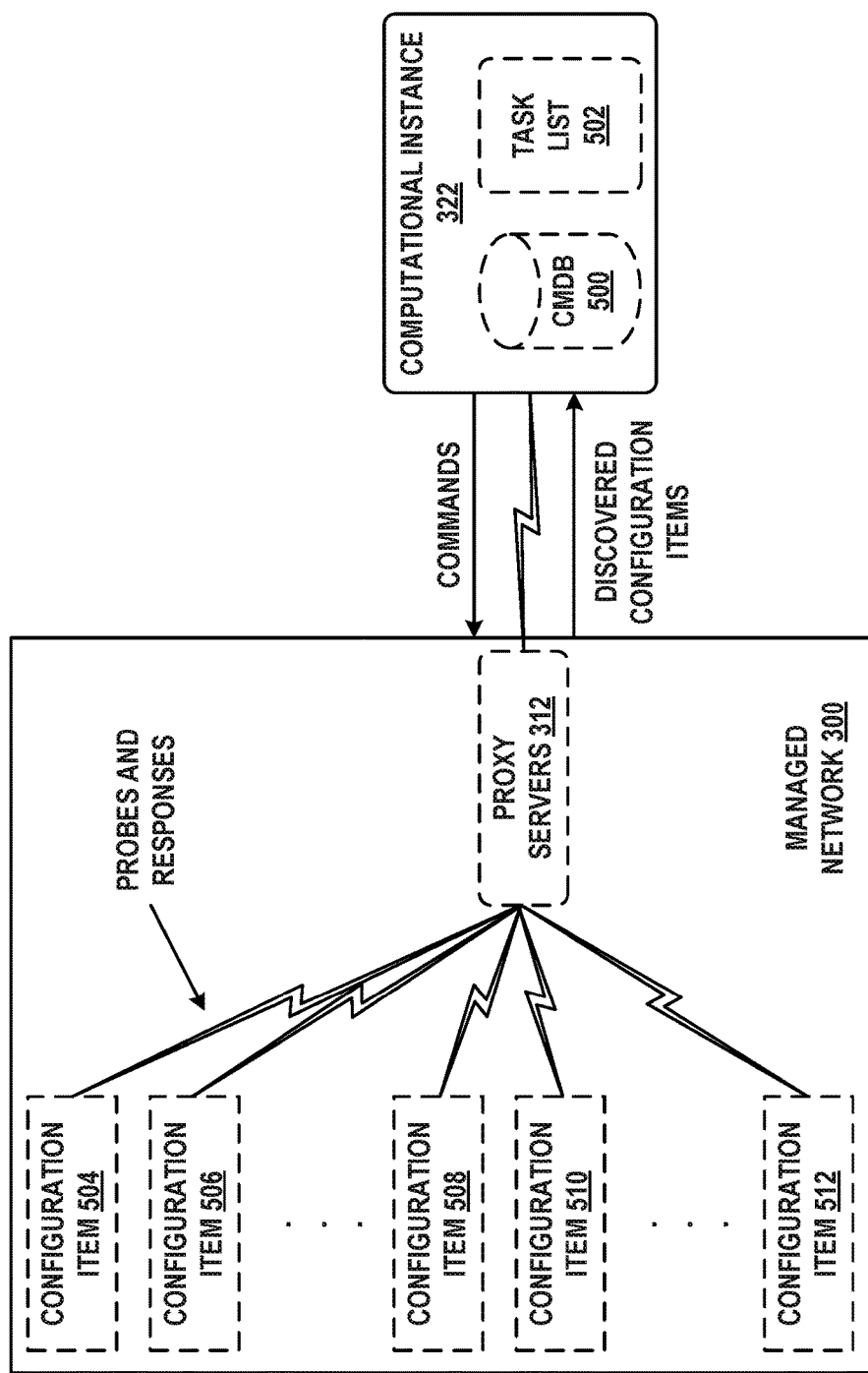
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
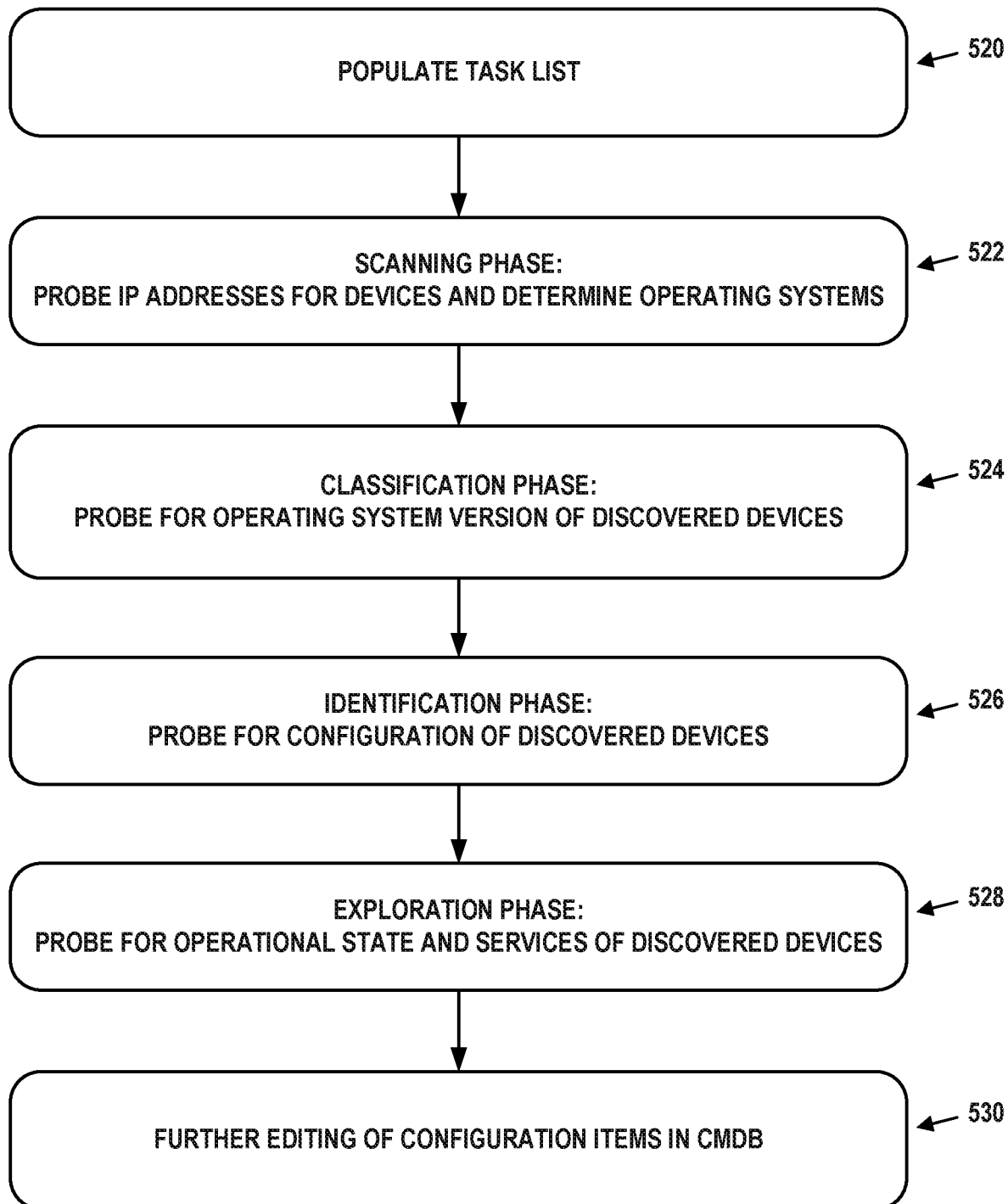
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE COLLABORATION PROXY OPERATIONS

In line with the discussion above, the remote network management platform 320 may provide a variety of services or other resources available to an enterprise (e.g., managed network 300) by way of one or more computational instances of remote network management platform 320. Such services or resources may take the form of websites, applications, or other web-accessible software within the computational instance, such as a messaging or "chat" application that enables internal or external users of the enterprise to engage in conversations with each other or with an agent of the enterprise.

Further, in some cases, users might prefer to access such services or resources via chat applications (e.g., Slack®, Facebook® Messenger, or MICROSOFT® Teams) running on the users' client devices (e.g., mobile devices) as opposed to accessing these services by way of a web interface of a computational instance. These chat applications may be developed and/or distributed by a third-party other than the operator of the remote network management platform. Such a third-party chat application could be a standard version of the third-party chat application, or could be a custom version of the third-party chat application associated with remote network management platform 320 (e.g., branded with a name, logo, and/or color scheme of remote network management platform 320).

User-to-user and user-to-group communications facilitated by chat applications may be mediated by a chat server. Thus, a user may authenticate himself or herself with the chat server (e.g., using a valid userid/password pair) to log on to the chat server. The user may be presented with options to initiate a one-to-one chat with another user, or join a chat room with one or more users. The user may also be prompted to reply to a chat request or invitation from other users, thereby joining a one-to-one chat or a chat room.

Regardless of which of these features are used, all communication between users may be facilitated by the chat server. Thus, when sending a chat message to another user or group, this message is transmitted by the user's device to the chat server, and the chat server then forwards the message to the appropriate participants. In order to facilitate proper configuration of the chat application, the user's device may be configured to use a particular URL of the chat server when communicating. This URL may be coded into the chat application program itself, or read from a configuration file for example.

But in the environment of remote network management platform 320, each computational instance may operate one or more of its own chat servers dedicated to a particular managed network. Since each chat application is configured to communicate by way of one URL, this means that there must be multiple versions of the chat application, one for each managed network supported by remote network management platform 320. In other words, the developer of the chat application has to compile or configure a specific version of the chat application for deployment to users of each managed network, this specific version configured with a URL that refers to the chat server of that managed network's computational instance.

This can be an inefficient and logistically challenging procedure when a large number of managed networks (e.g., hundreds or thousands) are supported. For instance, each time an upgrade to the chat application is produced (e.g., to add new features and/or fix defects), multiple versions of the chat application must be deployed, each with a different chat server URL. This results in a significant amount of time spent making sure that proper versions of the chat application are available to the respective managed networks, and that the right users are being provided with these respective versions.

In order to overcome these significant deficiencies, and well as for other reasons, the present disclosure provides an improvement to the remote network management platform 320 that can address the problems described above. Notably, each third-party chat application is configured with a single URL that identifies a proxy server within remote network management platform 320 (e.g., http://chat.provider.com). This proxy server may be placed in a special computational instance that is not specifically dedicated to any managed network. Upon receipt of chat messages, the proxy server can engage in a process to demultiplex the messages to the chat servers at appropriate computational instances. As such, multiple networks managed by the remote network management platform 320 can all use a single version of the third-party chat application. Consequently, the burdensome procedure of configuring multiple versions of the chat application for each of the respective managed network is eliminated.

These and other improvements are described in more detail below, though it should be understood that the operations described below are for purposes of example. The systems may provide other improvements as well.

The proxy server may take the form of a software application, which may be installed on remote network management platform 320 and operated by a computing device within remote network management platform 320. Accordingly, for the purposes of discussion, computational instance 322 may represent this software application, and thus the terms "proxy server," "proxy server application," and "computational instance 322" may be used interchangeably to refer to the entity that performs operations in accordance with the present disclosure. It should be understood, however, that such a proxy server could take other forms, and in practice computational instance 322 may also support other applications. In addition, it should also be understood that the proxy server described in the demultiplexing context of the present disclosure may be a distinct, separate entity from any of the proxy servers 312 that relate to the discovery processes described above.

Before a third-party chat application can access services or resources provided by remote network management platform 320 in accordance with the present disclosure, the third-party chat application may need to be registered with and authorized by remote network management platform 320. In some embodiments, a user may install a third-party chat application on the user's client device (e.g., one of client devices 302 in managed network 300) by way of a web interface of a computational instance. This installation may trigger an authorization and registration process with the proxy server to register the user and/or the third-party chat application with remote network management platform 320. Through this authorization and registration process, the proxy server may receive from the client device a message payload containing an identifier of the enterprise or other entity that controls the managed network (e.g., managed network 300) with which the user and client device are associated. The proxy server may then create and store mapping data defining a pairwise association between this identifier and a URL or other address that refers to the chat server of the managed network's computational instance (e.g., enterprise_id, instance_url). Thereafter, when the proxy server receives messages from the user via the third-party chat application, the proxy server may access the mapping data in order to route the message to that computational instance.

It should be understood that the authorization and registration process described above may be the same or different for various third-party chat applications. In addition, it should be understood that, through the authorization and registration process, the proxy server may receive and store other identifiers such as an identifier of the user and/or a team to which the user belongs, among other possibilities.

The authorization and registration process described above might occur only upon a user's first time installing a third-party chat application, and/or may occur at other times, such as after a threshold amount of time has passed since the user last accessed a given computational instance, after the third-party chat application has been uninstalled and then reinstalled on the user's client device, and/or after any event that might result in a change to either the identifier or URL of the stored mapping data.

The proxy server may store the mapping data in a database accessible to the proxy server. Such a database might be local to the proxy server. For instance, the database may take the form of a memory unit of the proxy server—namely, a memory unit of the computing device that is operating the proxy server application. Additionally or alternatively, the database might be located remotely from, and communicatively coupled to, the proxy server. For instance, the proxy server and the database may be separate but communicatively linked components disposed as part of remote network management platform 320.

Furthermore, the mapping data related to one or more entities may change over time due to various reasons. For example, the mapping data may be updated when a new entity registers one or more third-party chat applications. Additionally or alternatively, third-party chat applications being uninstalled, reinstalled, reconfigured, or otherwise changed may result in changes to the mapping data. In any event, the proxy server may be configured to receive the mapping data at a predefined frequency (e.g., every hour or every twenty four hours). The received mapping data may take the form of the most-recent update to the mapping data or, if the mapping data has not changed since the last time the proxy server received it, the received mapping data may take the form of the same mapping data as a previous version received by the proxy server. The proxy server may receive the mapping data in various ways. For example, the proxy server may access the mapping data by way of querying the database at the predefined frequency. Additionally or alternatively, the database may be configured to push the most-recent version of the mapping data to the proxy server at the predefined frequency. Other examples are possible as well. Further, in other embodiments, the proxy server may be configured to receive the mapping data at other times, not in accordance with the predefined frequency.

Figure 6:
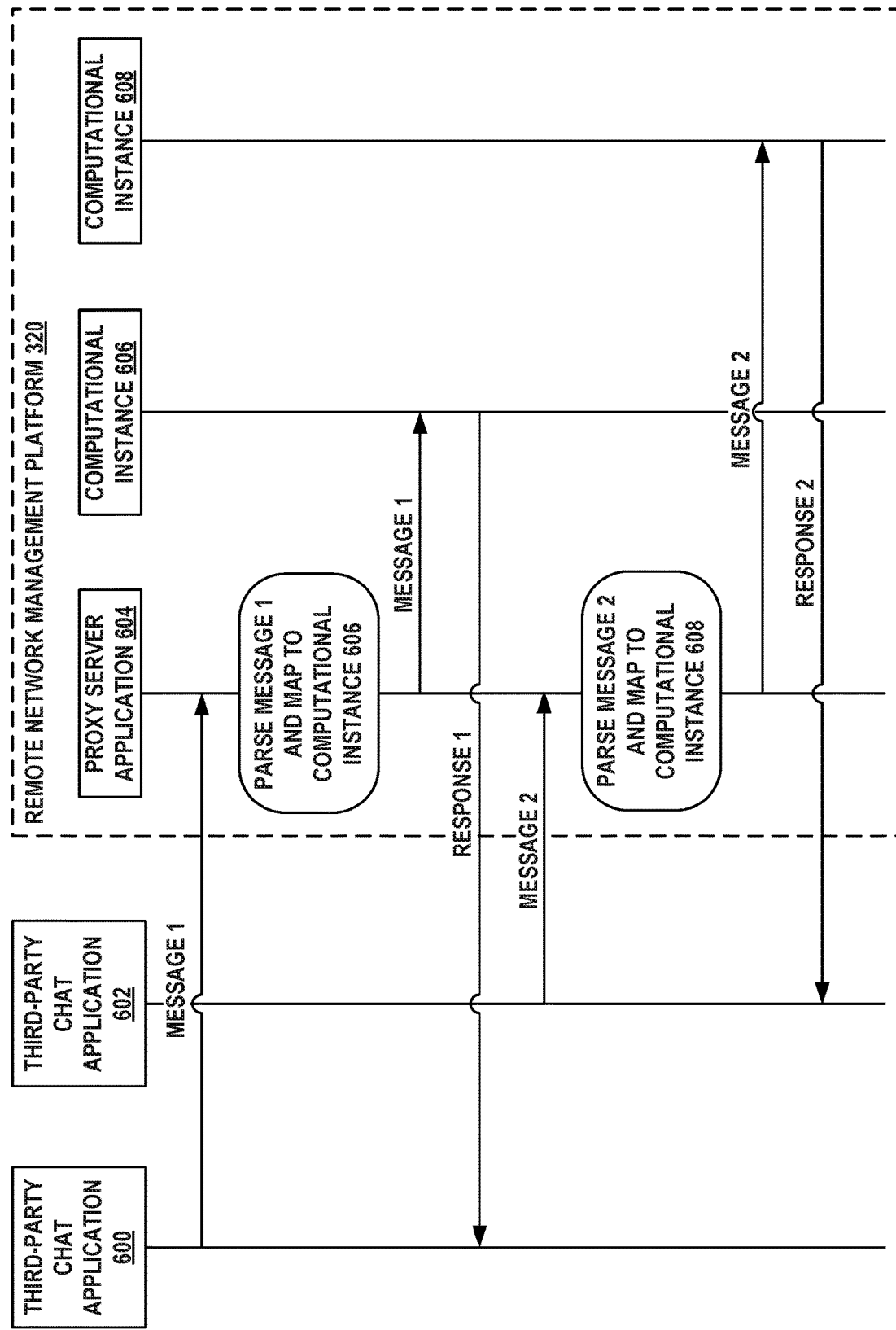
FIG. 6 illustrates an example demultiplexing process in the form of a ladder diagram, in accordance with example embodiments.

FIG. 6 illustrates an example demultiplexing process in the form of a ladder diagram. As shown, FIG. 6 illustrates transactions and messages between various third-party chat applications 600, 602, a proxy server application 604 (e.g., a proxy server), and various computational instances 606, 608. Proxy server application 604 and computational instances 606 and 608 are shown as part of remote network management platform 320. Each of third-party chat applications 600 and 602 may be executing on a respective client device disposed outside remote network management platform 320. Further, each of third-party chat applications 600 and 602 may be configured with a single URL that identifies proxy server application 604.

In addition, each of computational instances 606, 608 may be associated with a respective managed network controlled by a particular entity. For instance, computational instance 606 may be associated with managed network 300, whereas computational instance 608 may be associated with a different managed network.

In accordance with the operations of FIG. 6, proxy server application 604 may receive a chat message (MESSAGE 1) from third-party chat application 600. The message may be directed to an IP address that results from a DNS lookup of the domain name in the single URL with which third-party chat application 600 is configured. The message may take various forms, such as a message that is based on the Hypertext Transfer Protocol (HTTP) (e.g., a POST message). Further, the message may contain, as part of the message's payload, an identifier related the enterprise with which the user is associated. The identifier may take various forms, such as a text string, a numeric string, etc. that uniquely identifies the enterprise.

Next, proxy server application 604 parses the message and maps the message to computational instance 606. To facilitate this, upon receipt of the message, proxy server application 604 may determine a protocol type of the message. In practice, the protocol type may identify the third-party chat application (in this case, third-party chat application 600) and/or the client device that is running the third-party chat application. For example, the protocol type may indicate a TCP or UDP port number of the proxy server or other computing device running proxy server application 604. Additionally or alternatively, running proxy server application 604 may be configured to look at an application layer payload of the message, which might indicate an application layer protocol of the message.

Once proxy server application 604 determines the protocol type, proxy server application 604 may select a template that is associated with the protocol type and then use the template to parse the message and determine the identifier. Such a template may define a frame of reference that proxy server application 604 can use to find the identifier in the message. In particular, the frame of reference may indicate, to a particular degree, a location in the message at which proxy server application 604 can find the identifier.

In some embodiments, the identifier may have a format that includes a particular predefined sequence of letter or number characters. As such, the template may define the predefined sequence so that proxy server application 604 can parse the message and find the predefined sequence. Additionally or alternatively, the template may define where the identifier can be found with respect to (e.g., between or adjacent to) one or more delimiters such as braces, angle brackets, quotation marks, colons, and/or commas.

In some embodiments, the message may contain a special key/value pair that enables proxy server application 604 to find the identifier. In particular, the key in this special key/value pair may be a string and the value may denote the identifier itself. For example, in a key/value pair of "enterprise_id": "12345," "enterprise_id" may be the key, and "12345" may be the identifier. Accordingly, in such embodiments, the template may define where the key of the special key/value pair can be found. Proxy server application 604 may then use the template to find the key, and therefore find the associated value, which proxy server application 604 may determine to be the identifier. Key/value pairs can have various formats, such as JavaScript Object Notation (JSON) or other formats, and thus proxy server application 604 may be configured to recognize such formats. For instance, an JSON object may be written as a key/value pair having the form noted above—namely, "enterprise_id": "12345."

In other embodiments, the message may contain a special tag, such as an Extensible Markup Language (XML) tag, that enables proxy server application 604 to find the identifier. In particular, the special tag may have associated content and the content may denote the identifier. For example, a chat message might include the following language: <enterprise_id>12345<enterprise_id>, where <enterprise_id> is a special XML tag and 12345 is the associated content and the identifier. Accordingly, in such embodiments, the template may define where the special tag can be found. Proxy server application 604 may then use the template to find the tag, and therefore find the associated content, which proxy server application 604 may determine to be the identifier.

In line with the discussion above, a template may define where the key and/or value of a special key/value pair can be found with respect to one or more delimiters, or likewise where a special tag can be found with respect to one or more delimiters. For instance, the template may indicate that, for an XML tag, the tag's string will appear between two angled brackets. Additionally or alternatively, the template may indicate where the key or tag can be found with respect to other keys, tags, or objects within the message. For example, if the special key or special tag is nested under other keys or tags, the template may indicate those keys or tags under which the special key or special tag is nested. Other examples are possible as well.

To facilitate selection of an appropriate template, proxy server application 604 may have access to stored reference data correlating each of a plurality of protocol types (or, more particularly, each of a plurality of third-party chat applications identified by the protocol types of the plurality) to a respective template that is defined for that protocol type, and may refer to this reference data as a basis to select the appropriate template. For example, if the protocol type identifies third-party chat application 600 to be a Slack® chat application, proxy server application 604 may refer to the reference data and select the template associated with the Slack® chat application. Similarly, if the protocol type identifies third-party chat application 600 to be a MICROSOFT® Teams chat application, proxy server application 604 may refer to the reference data and select the template associated with the MICROSOFT® Teams chat application. Other examples are possible as well. In addition, while some protocol types may have different templates associated therewith, other protocol types may have the same template.

FIGS. 7A-7D each illustrate an example HTTP POST message that could be received at proxy server application 604 from a particular third-party chat application. In particular, each of FIGS. 7A-7D shows a particular key/value pair that indicates the identifier in the message. In line with the discussion above, proxy server application 604 may be configured to parse each such message using a template that corresponds to a respective protocol type and defines what key string proxy server application 604 should look for to find the associated value (i.e., the identifier).

FIG. 7A, for example, shows a message sent from a Slack® chat application. A template for Slack® chat application messages may direct proxy server application 604 to look for key/value pair 700 ("team_id": "TXXXXXXX"), where "team_id" is the key, and "TXXXXXXX" is the value and identifier. For example, the template may indicate that proxy server application 604 should look for the "team_id" key, and proxy server application 604 may thus search each line of the message until proxy server application 604 finds that key. Particularly, proxy server application 604 may search the first line shown in FIG. 7A ("token": "XXYYZZ"), then search the second line ("team_id": "TXXXXXXX"), upon which proxy server application 604 identifies the key, "team_id," of key/value pair 700 and thus determines the identifier to be the value, "TXXXXXXX," that is associated with that key.

FIG. 7B shows a message sent from a MICROSOFT® Teams chat application. A template for MICROSOFT® Teams chat application messages may direct proxy server application 604 to look for key/value pair 702 ("id": "72f988bf-86f1-41af-91ab-2d7cd011db47"), where "id" is the key, and "72P988bf-86f1-41af-91ab-2d7cd011db47" is the value and identifier." In particular, because other "id" keys appear in the message, the template may indicate that the "id" key in key/value pair 702 that proxy server application 604 should look for is a property of "tenant," which is in turn a nested property of "channelData."

FIG. 7C shows a message sent from a Facebook® Messenger chat application. A template for Facebook® Messenger chat application messages may direct proxy server application 604 to look for key/value pair 704 ("id": "<PAGE_ID>"), where "id" is the key, and "<PAGE_ID>" is the value and identifier. In particular, because another "id" key appears in the message nested under "recipient," the template may indicate that the "id" key in key/value pair 704 that proxy server application 604 should look for is a property of "sender." In some embodiments, messages sent from multiple chat applications managed by the same third-party may have similar formats, and thus the same template may be used for all of such messages. For example, a message sent from a Workplace by Facebook® chat application may have the same message format as Facebook® Messenger chat application messages, and thus the template for Workplace by Facebook® chat application messages may direct proxy server application 604 to look for key/value pair 704. Other examples are possible as well.

Referring back to FIG. 6, once proxy server application 604 has parsed the message and found the identifier, proxy server application 604 may access the mapping data (e.g., the most-recently received update to the mapping data) and compare the identifier to the mapping data. As described above, the mapping data may define a pairwise association between each of a plurality of identifiers and URLs of the chat servers of the appropriate computational instances. Thus, the act of comparing the identifier to the mapping data may involve proxy server application 604 referring to the mapping data and determining based on the mapping data that the identifier is associated with a particular URL of computational instance 606. Proxy server application 604 may then transmit the message to computational instance 606.

By way of example, proxy server application 604 may have access to Table 1, and may refer to Table 1 when determining where to transmit the message received from third-party chat application 600.

TABLE 1

| Identifier | URL |
| --- | --- |
| enterprise_id1 | computational_instance_606_url |
| enterprise_id2 | computational_instance_608_url |

As shown, Table 1 includes a pairwise association between the identifier, enterprise_id1, and a URL of a chat server of computational instance 606 (i.e., computational instance 606 url), and also includes a pairwise association between the identifier enterprise_id2 and a URL of a chat server of computational instance 608 (i.e., computational instance 608 url). As such, when proxy server application 604 determines that the message includes the identifier, enterprise_id1, proxy server application 604 may look up which URL is associated with that identifier (namely, computational instance 606 url), and then use that URL to transmit the message to computational instance 606. Other example tables are possible as well, as are other forms of mapping data. For example, other mapping data tables may include additional information that is associated with each identifier.

At some point after receiving the message, computational instance 606 may transmit back to third-party chat application 600 a response (RESPONSE 1) to the message. In some embodiments, such as the example shown in FIG. 6, the response message might not pass through proxy server application 604 and may instead be sent directly to third-party chat application 600. In other embodiments, however, proxy server application 604 may be configured to receive and then route responses.

In some embodiments, proxy server application 604 may be configured to rewrite inbound messages (i.e., messages transmitted from a third-party application to a computational instance) and/or outbound messages (i.e., messages transmitted from a computational instance to a third-party application), such as to remove sensitive information from such inbound and/or outbound messages. This act of rewriting messages may involve various processes, and may occur in various scenarios.

In some scenarios, for example, payloads of inbound messages from a third-party chat application (e.g., Slack®) may each include a special verification token (e.g., "token": "XXYYZZ", in FIG. 7A) that is global and unique to the third-party with which the third-party chat application is associated. However, due to various security reasons, it may be undesirable for proxy server application 604 to forward this special verification token to computational instances. For example, if the special verification token is received at the computational instance, an entity with access to the computational instance might be able to use the token to send fraudulent or other undesirable messages to other computational instances.

To address this issue, proxy server application 604 might be configured to receive from the third-party chat application inbound messages containing the special verification token, replace the special verification token in the message with an instance-specific access token associated with the computational instance to which the message is destined, and then forward the message to the computational instance. As such, the computational instance may see the instance-specific access token in the message payload, not the special verification token.

To facilitate this, when the computational instance is initially configured to support the third-party chat application, an instance-specific access token may be generated and stored in a database accessible by proxy server application 604, and/or may be stored at the computational instance. The instance-specific access token can then be added to mapping data that relates to the URL of the chat server at that computational instance (e.g., enterprise_id, instance_url, instance_token). For example, when computational instance 606 is first configured to support third-party chat application 600, proxy server application 604 or another device may store an instance-specific access token for computational instance 606 as part of the mapping data for the identifier. This is shown in Table 2 by way of example.

TABLE 2

| Identifier | URL | Instance-Specific Token |
|---|---|---|
| enterprise_id1 | computational_instance_606_url | instance_606_token |
| enterprise_id2 | computational_instance_608_url | instance_608_token |

Figure 8A:
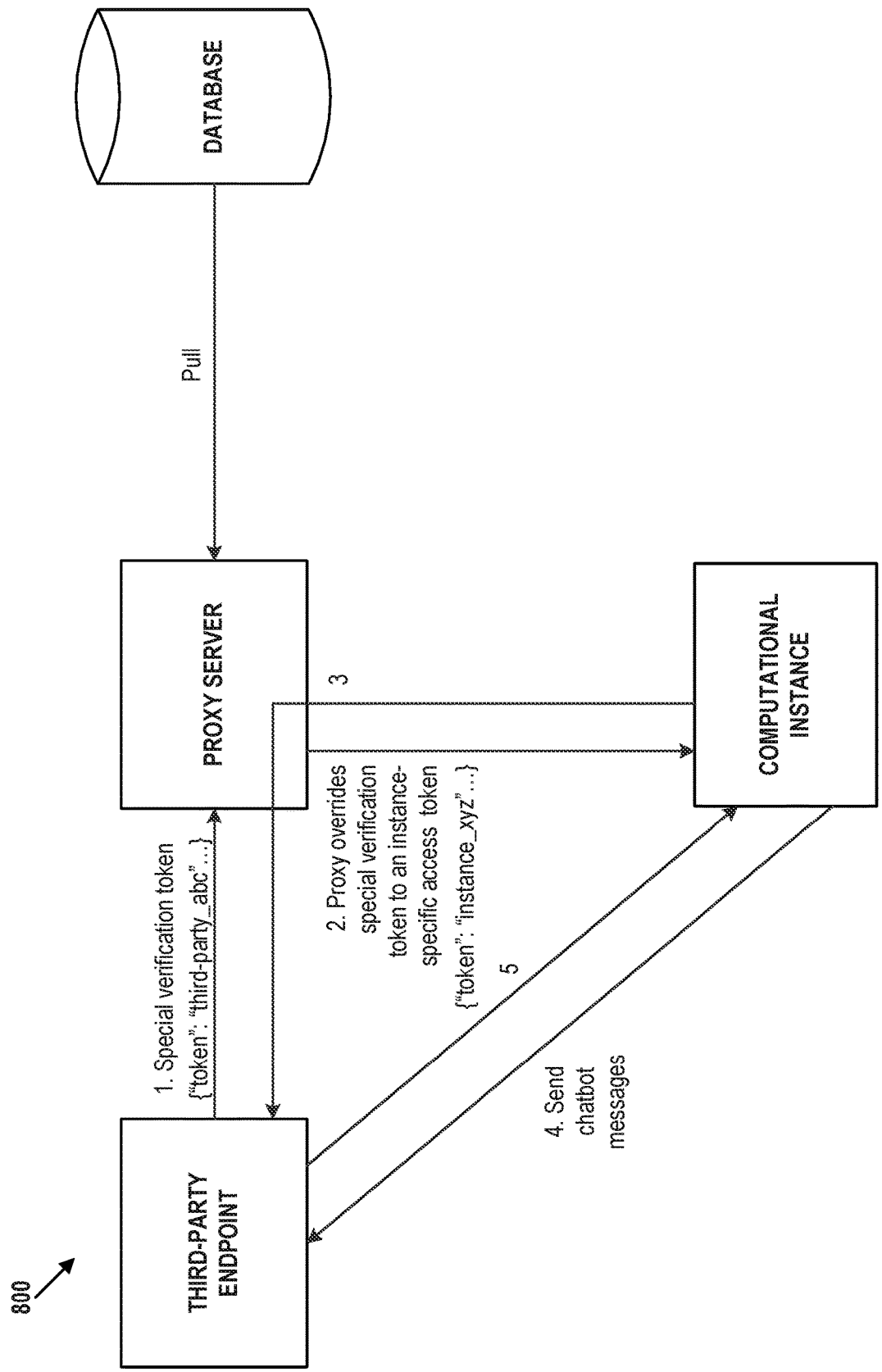
FIG. 8A illustrates a message flow diagram, in accordance with example embodiments.

Thereafter, when proxy server application 604 receives messages that contain the special verification token unique to the third-party associated with third-party chat application 600, proxy server application 604 may refer to the mapping data (e.g., Table 2), replace the special verification token with an instance-specific access token associated with computational instance 606 (e.g., instance 606 token), and then route the message to computational instance 606. FIG. 8A illustrates a message flow diagram 800 that depicts an example of these operations. Other examples are possible as well.

Figure 8B:
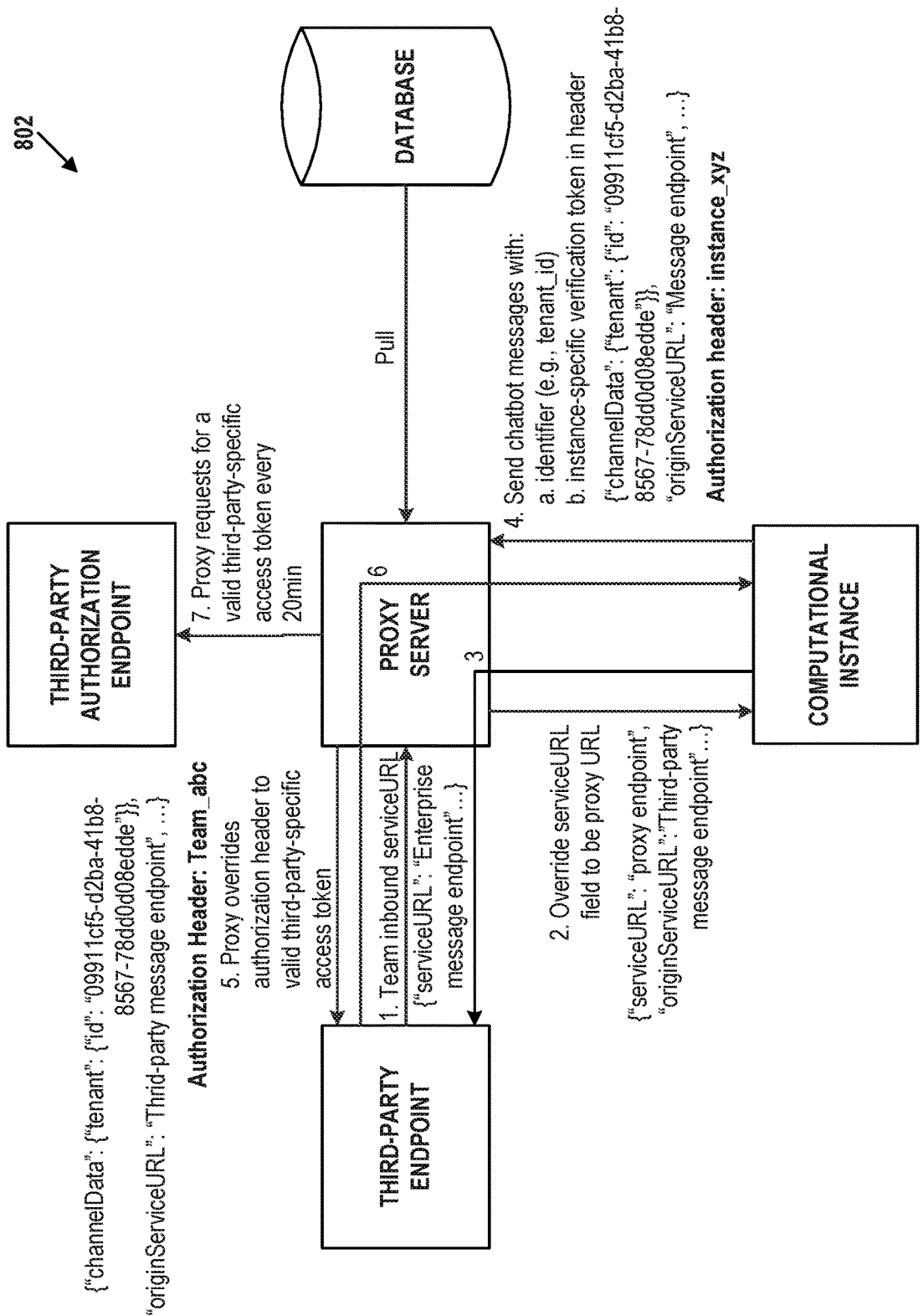
FIG. 8B illustrates a message flow diagram, in accordance with example embodiments.

In other scenarios, inbound messages received at proxy server application 604 may each include a URL of a third-party endpoint (e.g., a third-party-managed, cloud-based computing device associated with a given third-party application, such as a server) from which the messages were transmitted. In such scenarios, proxy server application 604 may be configured to replace, in each such message, the third-party endpoint URL with a URL associated with proxy server application 604, and then forward the message to the appropriate computational instance. FIG. 8B illustrates a message flow diagram 802 that depicts an example of these operations.

Furthermore, when a certain type of third-party chat application (e.g., MICROSOFT® Teams) is communicating with a computational instance, the computational instance would typically include, in messages transmitted by the computational instance and destined for the third-party endpoint associated with the particular third-party chat application, a global third-party-specific access token that the third-party endpoint is configured to recognize. As such, if the computational instance has access to this third-party-specific access token, the computational instance might be able to send messages to any client device running the third-party chat application. However, due to various security reasons, this may be undesirable. For example, if an unauthorized entity is operating the computational instance, the entity might be able to send fraudulent or otherwise undesirable messages to any user.

Accordingly, the disclosed proxy server application could be used to help address this issue. In particular, a given computational instance (e.g., a computational instance that supports MICROSOFT® Teams) could be configured to include in outbound messages an instance-specific verification token that is unique to the computational instance and associated with proxy server application 604. This instance-specific verification token could be stored at one or more of proxy server application 604, a database, and/or the computational instance. As such, proxy server application 604 could be configured to (i) receive an outbound message having this instance-specific verification token, (ii) use the instance-specific verification token to verify the authenticity of the outbound message and then, (iii) if the outbound message is authentic, replace the instance-specific verification token in the outbound message with the third-party-specific access token and forward the outbound message to the third-party endpoint. As so configured, the computational instance will not have access to the third-party-specific access token, thereby eliminating the potential security issue described above. Moreover, in some embodiments, the third-party might change the third-party-specific access token, and thus proxy server application 604 might be configured to receive, perhaps at a predefined frequency (e.g., every twenty minutes), updates to the third-party-specific access token. The message flow diagram 802 of FIG. 8B further depicts an example of these operations. Other examples are possible as well.

As also shown in FIG. 6, proxy server application 604 may perform the above-described demultiplexing process for third-party application 602 as well. In particular, proxy server application 604 receives a chat message (MESSAGE 2) from third-party chat application 602. Next, proxy server application 604 parses the message, determines an identifier for the entity that controls the managed network of which the third-party application 602 is a part, maps the message to computational instance 608, and then transmits the message to computational instance 608. For example, proxy server application 604 might determine that the message includes the identifier, channelId, look up in Table 1 which URL is associated with that identifier (namely, computational instance 608 url), and then use that URL to transmit the message to computational instance 608. At some point after receiving the message, computational instance 608 then transmits a response (RESPONSE 2) to third-party application 602.

In some embodiments, the example demultiplexing process may include more or less transactions and messages than those shown in FIG. 6, and/or may include more or less computing entities.

In some scenarios, a proxy server configured to implement the demultiplexing process described above may experience undesirable levels of load and/or latency. This may occur for various reasons. For instance, the proxy server may be receiving large quantities of incoming chat messages, may have difficulty communicating with client devices and/or chat servers, and/or may engage in frequent, numerous authentication and registration processes, among other possible reasons.

In any event, it may be advantageous in these scenarios, to implement multiple proxy servers, each of which having access to the mapping data and configured to perform the operations described herein. In some embodiments, remote network management platform 320 may include each such proxy server, and may additionally include a computing device that is communicatively coupled to each of the proxy servers and configured to function as a load balancer for the proxy servers. In other words, the computing device may be configured to manage which proxy server(s) should be used for performing the demultiplexing process and/or other operations described herein, and when those proxy server(s) should carry out such a process and/or operations. Similar to the proxy servers, such a computing device may be placed in a special computational instance that is not specifically dedicated to any managed network, such as the same computational instance as at least one of the proxy servers, or a different computational instance entirely.

In such embodiments, the computing device may manage the proxy servers based on a variety of factors. For example, the computing device may be configured to determine latency information associated with a given proxy server and use that latency information as an indication of the proxy server's load. The computing device can then decide, based on the determined latency for the proxy server, whether to select that proxy server for use in demultiplexing. For instance, the computing device may be configured to decide to select the proxy server if the determined latency of the proxy server is below a predefined threshold.

To facilitate using latency as a basis for selecting certain proxy servers, the computing device could be configured to transmit probe messages to each proxy, record the delay time between the transmission of the probe messages and the proxy server's response to one or more of the probe messages, and then use that delay time as an indication of the proxy server's load. The probe messages may be, for instance, Internet Control Message Protocol (IMCP) echo request and response (e.g., ping) messages, or some other type of probe message. Additionally or alternatively, the computing device could be arranged within remote network management platform 320 such that all chat messages and responses pass through the computing device. As such, the computing device could be configured to sample the times at which chat messages arrive from client devices, sample the times at which responses arrive from the various computational instances, and then determine an indication of the proxy server's load based on a difference between the arrival times of the chat messages and the arrival times of the corresponding responses. Other methods for determining latency for the proxy servers are possible as well, and other factors could be used as a basis for managing the proxy servers.

Example embodiments and variations of such embodiments have been described above, and other example embodiments and variations thereof are possible as well.

VI. EXAMPLE OPERATIONS

Figure 9:
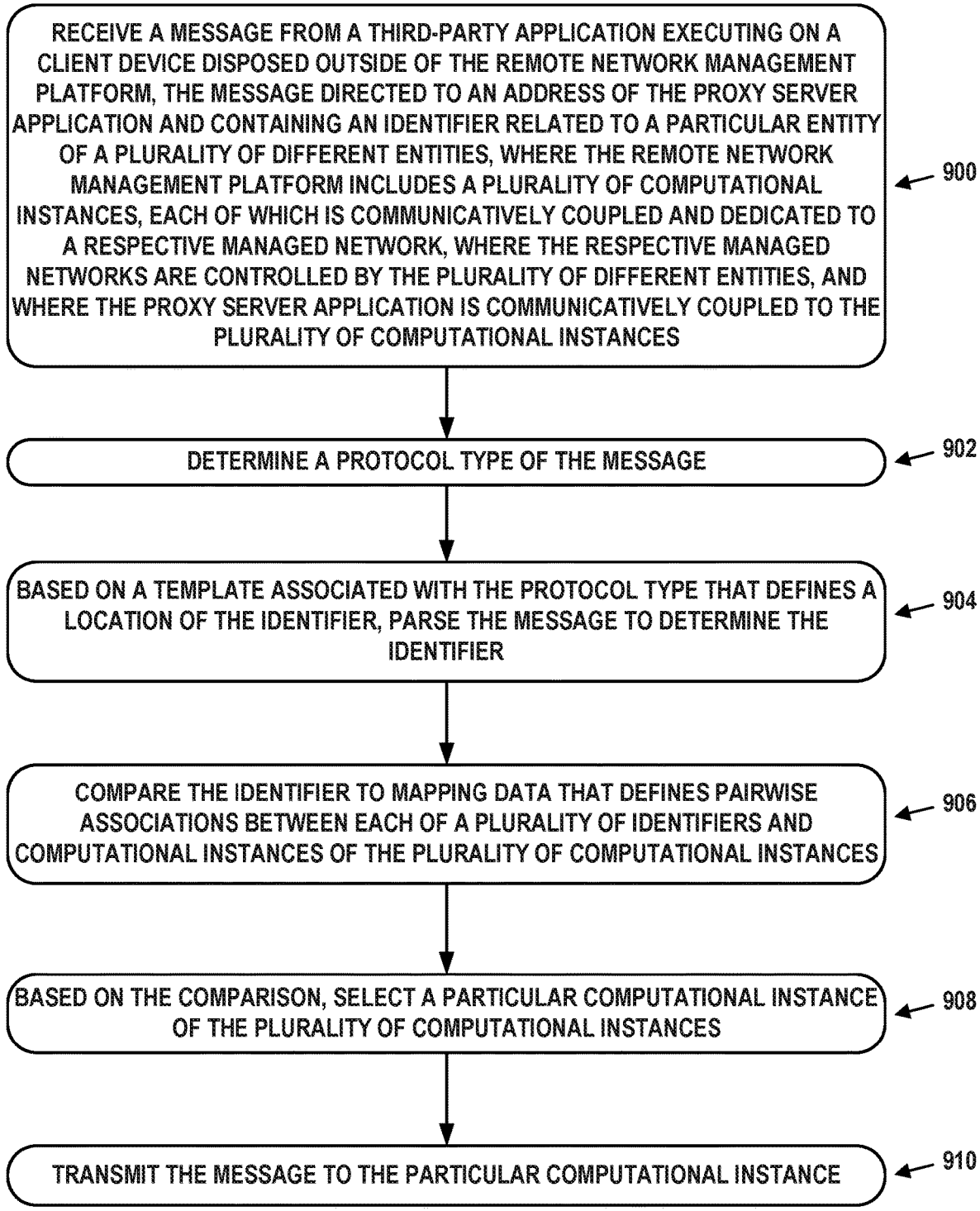
FIG. 9 depicts a flow chart, in accordance with example embodiments.

FIG. 9 depicts a flow chart illustrating an example embodiment. The process illustrated by FIG. 9 may be carried out by a computing device, such as computing device 100, a computational instance, such as computational instance 322, a proxy server application, such as proxy server application 604 of the remote network management platform 320 (different from proxy servers 312 used for discovery), and/or a cluster of computing devices, such as server cluster 200. However, the process can be carried out by other types of devices or device subsystems. For example, the process could be carried out by a portable computer, such as a laptop or a tablet device.

The embodiment of FIG. 9 may be simplified by the removal of any one or more of the features shown therein. Further, this embodiment may be combined with features, aspects, and/or implementations of any of the previous figures or otherwise described herein.

In FIG. 9, block 900 involves receiving a message from a third-party application executing on a client device disposed outside of the remote network management platform, the message directed to an address of the proxy server application and containing an identifier related to a particular entity of a plurality of different entities. The remote network management platform may include a plurality of computational instances, each of which is communicatively coupled and dedicated to a respective managed network. The respective managed networks may be controlled by the plurality of different entities. Further, the proxy server application may be communicatively coupled to the plurality of computational instances.

Block 902 involves determining a protocol type of the message.

Block 904 involves, based on a template associated with the protocol type that defines a location of the identifier, parsing the message to determine the identifier.

Block 906 involves comparing the identifier to mapping data that defines pairwise associations between each of a plurality of identifiers and computational instances of the plurality of computational instances.

Block 908 involves based on the comparison, selecting a particular computational instance of the plurality of computational instances.

Block 910 involves transmitting the message to the particular computational instance.

In some embodiments, the message may be based on the Hypertext Transfer Protocol (HTTP).

In some embodiments, the address of the proxy server application may be referenced to by a single URL with which the third-party application and at least one other third-party application are configured.

In some embodiments, proxy server application may receive, perhaps at a predefined frequency, updates to the mapping data. In such embodiments, the act of comparing the identifier to the mapping data may involve comparing the identifier to a most-recently received update to the mapping data.

In some embodiments, there may be a database that is accessible by the proxy server application and configured to store the mapping data. In such embodiments, the database may be stored at a computing device that is disposed within the remote network management platform and that operates the proxy server application. Additionally or alternatively, the database may be located remotely from, and communicatively coupled to, the proxy server application.

In some embodiments, the proxy server application may be one of a plurality of proxy server applications at the remote network management platform. Each such proxy server application of the plurality of proxy server applications may have access to the mapping data, and may be configured to perform the operations described herein. In such embodiments, the remote network management platform may include a computing device configured to select, from the plurality of proxy server applications, and based on latency information associated with each of the plurality of proxy server applications, a given proxy server application for use in performing the operations described herein.

In some embodiments, the template associated with the protocol type may define a location at which to find the identifier in the message.

In some embodiments, the act of parsing the message to determine the identifier based on the template associated with the protocol type that defines the location of the identifier may involve parsing the request to find a key of a JSON key/value pair and then determine the identifier to be a value of the JSON key/value pair.

In some embodiments, the act of parsing the message to determine the identifier based on the template associated with the protocol type that defines the location of the identifier may involve parsing the request to find a key of an XML tag and then determine the identifier to be content with which the XML tag is associated.

In some embodiments, the protocol type may be associated with a destination TCP or UDP port number.

In some embodiments, the third-party application may be a messaging application. In such embodiments, the protocol type may indicate an application layer protocol.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system, comprising:
a processor; and
a memory, accessible by the processor, the memory storing instructions, that when executed by the processor, cause the processor to perform operations comprising:
receiving a message from a first communication software application executing on a computing device disposed outside of a plurality of managed networks associated with a plurality of respective computational instances;
determining a protocol type associated with the message in response to receiving the message, wherein the protocol type is indicative of the first communication software application;
parsing the message to determine an identifier based on a template associated with the protocol type, wherein the template defines a location of the identifier in the message, and wherein the identifier is indicative of a particular computational instance of the plurality of respective computational instances;
comparing the identifier to mapping data to identify a second communication software application associated with the particular computational instance, wherein the mapping data defines a plurality of associations between respective identifiers and respective communication software applications of respective computational instances of the plurality of respective computational instances; and
transmitting the message to the second communication software application of the particular computational instance.

2. The system of claim 1, wherein parsing the message comprises parsing the message to find a JavaScript Object Notation (JSON) object, and wherein the JSON object comprises the identifier.

3. The system of claim 1, wherein parsing the message comprises parsing the message to find an Extensible Markup Language (XML) tag, and wherein the identifier is content associated with the XML tag.

4. The system of claim 1, wherein the plurality of respective computational instances are hosted by a single remote network management platform.

5. The system of claim 1, wherein the operations comprise receiving an additional message from the particular computational instance, wherein the additional message comprises a verification token.

6. The system of claim 5, wherein the operations comprise:
verifying authenticity of the additional message based on the verification token;
replacing the verification token in the additional message with an access token associated with an additional computing device executing the second communication software application; and
transmitting the additional message to the additional computing device.

7. A method, comprising:
receiving, via a server device, a message from a first communication software application executing on a computing device disposed outside of a plurality of managed networks associated with a plurality of respective computational instances;
determining, via the server device, a protocol type associated with the message in response to receiving the message, wherein the protocol type is indicative of the first communication software application;
parsing, via the server device, the message to determine an identifier based on a template associated with the protocol type, wherein the template defines a location of the identifier in the message, and wherein the identifier is indicative of a particular computational instance of the plurality of respective computational instances;
comparing, via the server device, the identifier to mapping data to identify a second communication software application associated with the particular computational instance, wherein the mapping data defines a plurality of associations between respective identifiers and respective communication software applications of respective computational instances of the plurality of respective computational instances; and
transmitting, via the server device, the message to the second communication software application of the particular computational instance.

8. The method of claim 7, wherein:
receiving the message from the first communication software application executing on the computing device comprises receiving a plurality of messages from a plurality of software applications executing on a plurality of respective computing devices;
determining the protocol type associated with the message comprises determining the protocol type associated with each message of the plurality of messages;
parsing the message to determine the identifier based on the template associated with the protocol type comprises parsing each message of the plurality of messages to determine respective identifiers based on respective templates associated with the protocol type indicative of a respective software application of the plurality of software applications associated with each message;
comparing the identifier to the mapping data to identify the second communication software application associated with the particular computational instance comprises comparing each identifier of the respective identifiers to the mapping data to identify the respective computational instances of the plurality of respective computational instances associated with the plurality of messages; and
transmitting the message to the second communication software application of the particular computational instance comprises transmitting each message of the plurality of messages to the respective computational instances of the plurality of respective computational instances.

9. The method of claim 8, wherein each software application of the plurality of software applications is configured with a single uniform resource locator (URL) that identifies the server device.

10. The method of claim 7, wherein the mapping data is stored in a database accessible by the server device in response to the first communication software application being registered with one or more respective computational instances of the plurality of respective computational instances.

11. The method of claim 10, wherein the mapping data is updated with an additional association between an additional identifier and an additional computational instance in response to the first communication software application being registered with the additional computational instance.

12. The method of claim 7, wherein the message comprises a URL associated with the first communication software application.

13. The method of claim 12, comprising replacing the URL associated with the first communication software application with a URL associated with the server device.

14. A non-transitory, computer-readable medium, comprising instructions that when executed by one or more processors, cause the one or more processors to perform operations comprising:
receiving a message from a first communication software application executing on a computing device disposed outside of a plurality of managed networks associated with a plurality of respective computational instances;
determining a protocol type associated with the message in response to receiving the message, wherein the protocol type is indicative of the first communication software application;
parsing the message to determine an identifier based on a template associated with the protocol type, wherein the template defines a location of the identifier in the message, and wherein the identifier is indicative of a particular computational instance of the plurality of respective computational instances;
comparing the identifier to mapping data to identify a second communication software application associated with the particular computational instance, wherein the mapping data defines a plurality of associations between respective identifiers and respective communication software applications of respective computational instances of the plurality of respective computational instances; and
transmitting the message to the second communication software application of the particular computational instance.

15. The non-transitory, computer-readable medium of claim 14, wherein the mapping data is created and stored in a database in response to the first communication software application being registered with one or more respective computational instances of the plurality of respective computational instances.

16. The non-transitory, computer-readable medium of claim 14, wherein the protocol type is associated with a destination Transmission Control Protocol (TCP) port number or a User Datagram Protocol (UDP) port number.

17. The non-transitory, computer-readable medium of claim 14, wherein the message comprises a verification token unique to the first communication software application.

18. The non-transitory, computer-readable medium of claim 17, wherein the operations comprise replacing the verification token with an access token associated with the particular computational instance before transmitting the message to the second communication software application of the particular computational instance.

19. The non-transitory, computer-readable medium of claim 14, wherein the message is based on Hypertext Transfer Protocol (HTTP).

20. The system of claim 1, wherein the operations comprise storing reference data that defines a second plurality of respective associations between a plurality of templates and a plurality of protocol types, and wherein the plurality of templates comprise the template.

* * * * *